United States Patent [19]

Simmons

[11] 4,155,113
[45] May 15, 1979

[54] PROTECTIVE CIRCUIT FOR TRANSISTORIZED INVERTER-RECTIFIER APPARATUS

[75] Inventor: David H. Simmons, Palo Alto, Calif.

[73] Assignee: Litton Systems, Inc., San Carlos, Calif.

[21] Appl. No.: 842,604

[22] Filed: Oct. 17, 1977

[51] Int. Cl.² ............................................ H02M 1/18
[52] U.S. Cl. ........................................ 363/56; 363/24; 363/134
[58] Field of Search ..................... 363/24, 25, 55, 56, 363/97, 133, 134

[56] References Cited

U.S. PATENT DOCUMENTS

| | | | |
|---|---|---|---|
| 3,411,067 | 11/1968 | Rodal | 363/97 |
| 3,495,156 | 2/1970 | Hamilton et al. | 363/133 |
| 3,838,329 | 9/1974 | Michelet et al. | 363/25 |
| 3,930,194 | 12/1975 | Walker | 363/56 |
| 4,044,294 | 8/1977 | Grundy | 363/56 X |
| 4,048,552 | 9/1977 | Stone | 363/25 |

*Primary Examiner*—William M. Shoop
*Attorney, Agent, or Firm*—Norman E. Brunell; Walter R. Thiel; Ronald M. Goldman

[57] ABSTRACT

Inverter-rectifier combinations of the type which include at least a pair of transistors for alternately applying DC current to a transformer to generate alternating voltage from a DC source, and a digital semiconductor type driving means for alternately providing voltage pulses of given duration and at a periodic repetition rate at each of two outputs for controlling such alternating operation of the transistors is improved in a combination containing a protective circuit located in between the driving circuit and the inputs to the inverter transistors. The protective circuit contains first and second inputs and corresponding first and second outputs with the inputs being connected to an associated one of the two driving means outputs, and the outputs being connected to an associated one of the two inverter transistors; cross-gating means, including linear semiconductor switch means, for producing a driving output pulse on a one of the outputs responsive to the presence of a voltage pulse at an associated one of said inputs and only during the absence of a voltage pulse at the other one of said inputs; and delay means for inhibiting the application of said driving output pulse at a one of said circuit outputs until the lapse of a predetermined interval of time subsequent to the termination of application of a driving output pulse to the other one of said circuit outputs, the predetermined time interval being at least as great as the defined charge storage time of the inverter transistors and less than half the duration preferably of the pulses supplied by the digital control circuit; whereby the inverter transistors are not driven into overlapping operation.

13 Claims, 16 Drawing Figures

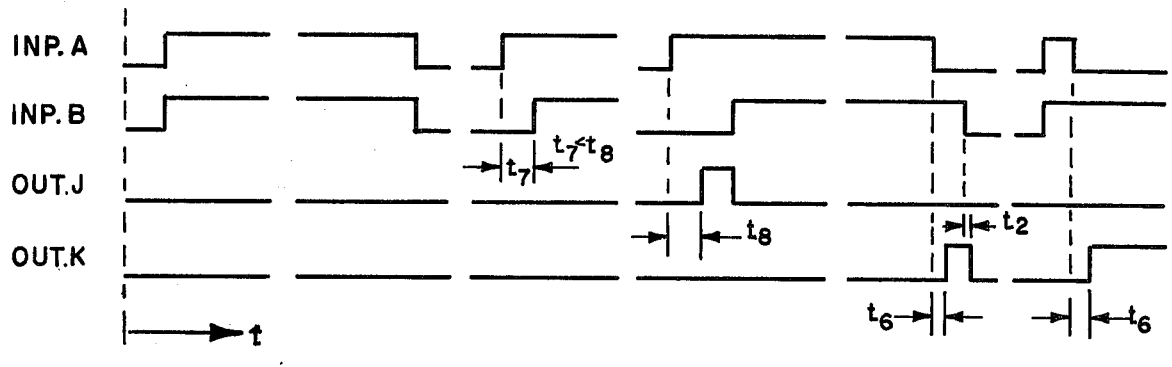

PROTECTIVE CIRCUIT FOR TRANSISTORIZED INVERTER-RECTIFIER APPARATUS

BACKGROUND OF THE INVENTION

My invention relates to digitally controlled high power transistorized inverter-rectifier combinations and, more particularly, to a protective circuit for high power transistorized inverter-rectifier combinations containing digital type driving means for controlling alternate operation of the transistors.

Inverter-rectifiers are a class of known electrical apparatus having the function of converting an input DC voltage to a DC voltage of a different level using elements which develop from the DC voltage applied AC voltages or currents and transforms such AC to a different AC voltage. This inversion process is followed by rectification to produce the DC voltage level required and, typically, the apparatus includes regulating means to stabilize the output DC voltage at the desired level. Conventional inverter-rectifiers are transistorized and in those designs at least a pair of transistors are coupled to a transformer either through a center tapped primary winding or through individual primary windings. Each of the transistors alternately conducts current for an interval through the associated transformer winding or winding portion under control of a drive voltage pulse applied alternately to the transistors, and the transformer windings are arranged so that current which flows under control of one transistor is electrically "poled" oppositely to the direction of current through the winding portion conducted by the second transistor. Hence, by alternately turning each transistor on and off, an alternating magnetic field is created within the magnetic transformer core to induce an AC voltage in a secondary winding.

The high power inverter-rectifier combinations employ digital type semiconductor means to provide drive pulses alternately to the inverter transistors. One inverter combination with which I am most familiar is the subject of a prior invention described in a co-pending application for patent, Ser. No. 686,797, filed May 17, 1976, and now U.S. Pat. 4,017,784, for a DC to DC converter, assigned to the assignee of this application, the disclosure of which is by reference specifically incorporated herein in its entirety. The cited application discloses a digital type semiconductor circuit employing various monostable multivibrators, Nand gates and the like, which are used to provide pulses alternately to inverter transistors $Q_1$ and $Q_2$ or to two pairs of transistors $Q_{11}$ and $Q_{41}$ and $Q_{21}$ and $Q_{31}$, each pair of which conducts current alternately.

In the operation of the inverter the transistors conduct current alternately under control of digital circuits and it is abnormal if such transistors conduct current simultaneously for any interval, however short. Undoubtedly, in some of such prior art inverters which I characterize as low power, it is conceivable that transistor damage does not result if the transistors intended for alternate current conduction do so simultaneously. However, in high power inverter-rectifiers, for example in the range of 100 watts and above, simultaneous operation of the inverter transistors is quite likely to cause transistor damage. The burdens associated with electrical equipment failure of that type is evident, particularly where the inverter-rectifier combination is part of an airborne military electronic system where untimely failure can be critical and, in better circumstances, the replacement of high power transistors is very expensive.

In theory, such digital control circuits prevent both inverter transistors from simultaneously being placed in the current conducting or "on" condition. In practice, such circuits appear somewhat reliable. Thus, I was confronted with inverter transistor failure in the inverter described in said cited patent application, a failure which had no apparent cause. Although the inverter functioned properly in one power supply, it failed in use with a second seemingly identical power supply. And a check of the digital control circuits in the failed apparatus showed them to function as designed to provide voltage pulses in an alternate manner to each inverter transistor. The speculation is made that electronic noise of a fleeting character was present for a short moment, such as that which could be generated by power supply line transients or interruptions in or arcing of the electrical load supplied by the inverter-rectifier combination which, although a fleeting and difficult to detect phenomenon, could be sufficient to cause malfunction of digital type semiconductor control circuits which are known have limited electronic noise immunity, I deduced that a malfunction, thus, in the digital drive circuits could result in driving both inverter transistors into the current conducting condition simultaneously for a moment and that overlapping operation was sufficient to destroy at least one transistor, leading to the failures of mysterious and undefined origin encountered in practice.

A major purpose of the invention is to improve the reliability and life of high power inverter rectifier combinations.

The present invention accordingly minimizes simultaneous or overlapping operation of inverter transistors intended for alternate operation arising from malfunction of the inverter's associated digital control circuits, such as caused by ambient electronic noise. A further object of the invention is to enhance the reliability and life of transistorized high power inverter-rectifier combinations. And an ancillary object of the invention is to provide a protection circuit for inverter transistors which is versatile in application and relatively immune to the kind of transient voltages that adversely affects electrical inverter apparatus digital control circuits.

SUMMARY OF THE INVENTION

My invention is designed for use in a combination with an inverter-rectifier of the type which has at least a pair of transistors for alternately applying DC current to a transformer, whereby the transformer may generate an AC voltage, and a digital semiconductor type driving means for alternately providing voltage pulses of given duration at a periodic repetition rate at each of two outputs. It includes a protection circuit, located in between in circuit said driving means and said inverter transistors, containing cross-gating means, including linear semiconductor switch means, for producing a driving output pulse to one of the transistors responsive to the presence of a voltage pulse at an associated one of said outputs of said driving means but only during the absence or nonoccurrence of a voltage pulse at the other one of said outputs of said driving means, and delay means coupled to said cross-gating means for inhibiting the application of said driving output pulses to the one of said transistors until the lapse of a predetermined time interval subsequent to the termination of application of a driving output pulse to the other one of said inverter transistors, the time interval being at least as great as the charge storage time of the inverter transistors and less than half the duration of the pulses supplied by said driving means.

In a more specific aspect of the invention, the protective circuit includes a first and a second linear semiconductor switch means, suitably an operational amplifier, each of which contains a first input, a second or reference input, and an output, and which exhibits the electrical property of switching the state of its output only when the voltage level at the first input exceeds the voltage level applied at said reference input, first means for coupling the first input of the first switch means in circuit with said first output of said digital driving means, second means connecting the reference input of said second switch means in circuit with the first output of said driving means, third means connecting the first input of said second switch means in circuit with the second output of said driving means, and fourth means connecting said reference input of said first switch means in circuit with said second output of said driving means, and means connecting the outputs of said first and second switch means, respectively, in circuit with the associated bases of the inverter transistors.

In a still further aspect of the invention, the delay means comprises a timing network included in said first means, a timing network included in said third means for delaying the application of a sufficient voltage level to the respective first inputs of said switch means by an interval at least equal to the charge storage time of said transistors, and wherein a discharge time delay network is included in said second means and a discharge delay network is included in said fourth means for delaying the removal of voltage from said reference inputs of said switch means subsequent to termination of the voltage pulse at the associated driving circuit output to insure that the associated switch means does not produce a driving pulse for a predetermined interval even though a voltage is applied to said first input from the output of said associated driving means transistor.

The foregoing objects and advantages as well as the structure characteristic of my invention, heretofore briefly summarized, as well as additional objects and advantages and equivalent structure, may be better understood by the reader through consideration of the detailed description of a preferred embodiment of my invention considered together with the illustrations of same, presented in the accompanying drawings.

BRIEF DESCRIPTION OF DRAWINGS

In the drawings:

FIG. 2 graphically depicts various voltage and current wave forms occurring in the operation of the embodiment of FIG. 1; and FIG. 3 depicts various voltage waveforms occurring in the operation of the embodiment of FIG. 1 under various fault conditions.

DESCRIPTION OF THE PREFERRED EMBODIMENTS

Figure 1:
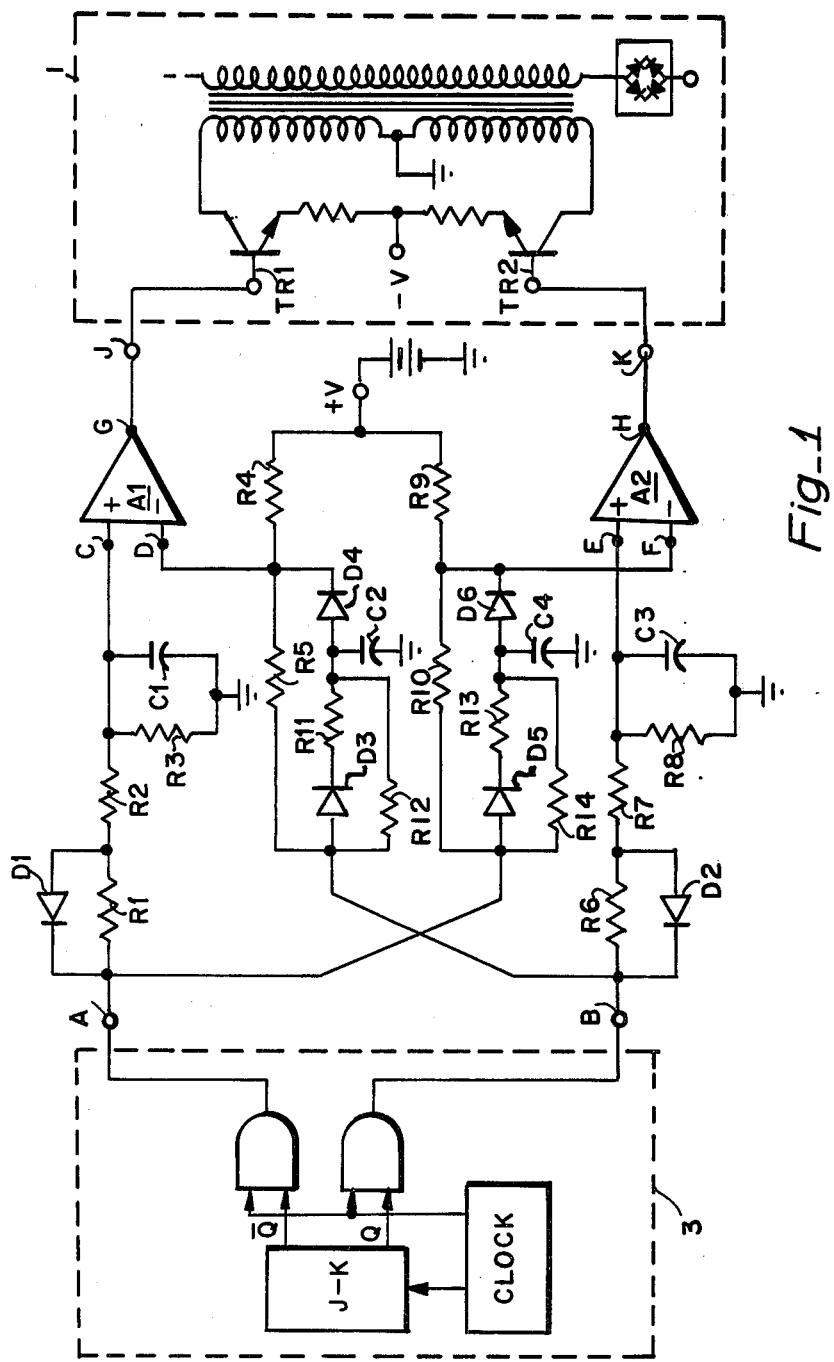
FIG. 1 illustrates in electrical schematic form a preferred embodiment of my invention.

A preferred embodiment of the invention is illustrated in FIG. 1 in the form of an electrical schematic to which reference is made. The protective circuit appears in circuit in between the inverter transistors and transformer, denoted symbolically in rectangle 1 in dash lines, and the digital type transistor drive control signals, denoted generally by the rectangle 3 in dash lines, in an inverter combination. A first input A and a second input B designate the connections to the corresponding outputs of the digital type drive circuit 3. A first output J and a second output K of the protective circuit are connected in circuit with the bases of the corresponding two inputs of the inverter transistors $TR_1$ and $TR_2$ in circuit 1. A first linear semiconductor switch $A_1$, suitably a conventional integrated circuit operational amplifier, and a second linear semiconductor switch $A_2$ of like construction are provided. Switch $A_1$ includes a "+" input C, a "−" input D, and an output G, and switch $A_2$ includes a "+" input E, a "−" input F, and an output H.

The operational amplifiers are conventional linear semiconductor circuit devices, commercially available, which exhibit the electronic property of providing a first or "high" output voltage when the voltage applied to the "+" input exceeds that voltage applied to its "−" reference input and switches to or presents, as variously termed, a "low" or second output voltage under other conditions of input voltages at the "+" and "−" inputs. Preferably the specific kind of "op-amp" selected has a switching time between states at least as fast as 0.1 microseconds and is suitable for use with voltage sources having DC voltage levels of reasonable tolerance so as to remain unaffected by normal variation of source voltage.

A resistor $R_1$ and a resistor $R_2$ are connected in series between input A and op-amp $A_1$ input C. A resistor $R_3$ and a capacitor $C_1$ are connected in parallel between $A_1$ input C and the circuit common or ground, as represented by the ground symbol. Diode $D_1$ is connected in shunt of resistor $R_1$ with the cathode end thereof connected in circuit with input A.

Resistors $R_1$ and $R_2$ are of intermediate values and resistor $R_3$ is of a relatively high value. As may be noted by the reader, resistors $R_1$ and $R_2$ and capacitor $C_1$ form an R-C type timing network, having a time constant, T, of $(R_1+R_2) \cdot (C_1)$.

A resistor $R_6$ is connected in electrical series circuit with a resistor $R_7$ between circuit input B and switch $A_2$ input E. A resistor $R_8$ and a capacitor $C_3$ are connected in parallel between switch input E and electrical ground and diode $D_2$ is connected in shunt of resistor $R_6$ with the cathode end thereof electrically poled in the direction of circuit input B.

The values of the resistors and capacitor are essentially the same as the corresponding elements previously described connected to input C and the circuit is essentially symmetrical electrically as is apparent from the figure. Thus, resistors $R_6$ and $R_7$, together with capacitor $C_3$, form a conventional R-C type timing network of time constant, T, $(R_6+R_7) \cdot (C_3)$.

Resistors $R_{10}$ and $R_9$ are connected electrically in series circuit between voltage source $+V$ and circuit input A so as to form a resistive voltage divider network therebetween and the output of the divider, the circuit juncture of the resistors, is connected in circuit with input F of semiconductor switch $A_2$. A diode $D_5$, resistor $R_{13}$, and a diode $D_6$ are connected in series between circuit input A and switch $A_2$, input F and the diodes are poled electrically in the same direction and with the anode of $D_5$ connected to circuit input A. A resistor $R_{14}$ is connected in shunt of that portion of the aforedescribed series circuit containing diodes $D_5$ and resistor $R_{13}$ and a capacitor $C_4$ is connected between the anode end of diode $D_6$ and electrical ground potential. As becomes more apparent hereinafter, resistor $R_{14}$ and capacitor $C_4$ form a discharge type R-C timing network.

Correspondingly, a resistor $R_4$ and $R_5$ are connected in electrical series circuit between source +V and circuit input B to form a voltage divider therebetween with the output thereof, the circuit juncture of the resistors, connected in circuit with input D of switch $A_1$. Diode $D_3$, resistor $R_{11}$, and diode $D_4$ are connected in an electrical series circuit between circuit input B and switch $A_1$, input D. The diodes are poled electrically in the same direction and the anode end of $D_3$ is located toward the circuit input B. A resistor $R_{12}$ is connected in shunt of that portion of the series circuit containing diode $D_3$ and resistor $R_{11}$, and a capacitor $C_2$ is connected between the anode end of diode $D_4$ and electrical ground potential. Resistor $R_{12}$ and capacitor $C_4$ form a discharge type R-C timing network. The output of the switches G and H are connected to the circuit outputs J and K, respectively. The elements in this circuit are essentially the same as those in the circuit connected to input F.

In connection with the following discussion of the operation of the protective circuit of FIG. 1, the illustration of FIG. 2 should be considered together with FIG. 1. In the normal operation of the inverter combination, digital control circuit 3 normally provides a positive or "high" voltage pulse $V_c$ of predetermined duration $t_p$ at inputs A and B on an alternating basis, as is known to those skilled in this art, represented in FIGS. 2A and 2B, respectively. By way of specific example, this may be a pulse which occurs at a rate or frequency of 27 kilohertz, is of a 15 microsecond pulse width, and is of a peak pulse level of +15 volts. During the absence of the pulse, the circuit input conventionally is placed at a low level, such as zero volts or ground potential, as alternatively termed. These control pulses in the prior inverter combination may have been applied directly to the corresponding outputs C and D to control operation of the corresponding associated transistors in inverter portion 1, which functions in a known manner, without the intervening protective circuit. It is noted that the circuit ground or common is common to inverter portions 1 and 3 and to the protective circuit as well.

Initially, with a low at both inputs A and B, a current from the connected source +V flows through the voltage divider, resistors $R_3$ and $R_5$ to circuit input B, which, as stated, is at approximately zero volts, and a small positive voltage is applied from the divider to input D of operational amplifier $A_1$ to establish a reference switching level. Correspondingly, a current flows from source +V through resistors $R_9$ and $R_{10}$ through circuit input A, considered at a voltage "low" such as zero volts, and a small voltage is applied from the voltage divider to input F of operational amplifier $A_2$ to initially establish a reference switching level for $A_2$. Assuming the high at input A, illustrated at $t_{(1)}$ in FIG. 2A, to persist for interval $t_1$ in FIG. 2C, as soon as and only if the voltage across capacitor $C_1$ attains the level applied by the voltage divider to input D, switch $A_1$ changes its output at G, almost instantaneously, from a low or zero volts to a voltage high as at $t_{(2)}$ in FIG. 2E, such as +15 volts, by way of specific example. This output voltage is coupled by a circuit output J to the associated one $TR_1$ of the inverter transistors in the inverter circuit to provide the drive signal which turns the transistor "on" for the duration of this high output signal. It should be noted that capacitor $C_1$ continues to change to a higher voltage, to the level of the voltage crop across resistor $R_3$ which limits the voltage across $C_1$ and that the voltage across $R_3$ is always slightly less than the level applied at input A, input B, or +V. Concurrently wth the appearance of the voltage "high" pulse at circuit input A, both ends of the voltage divider formed of resistor $R_9$ and $R_{10}$ are placed at a high positive voltage of +V and the input F of switch $A_2$, the reference input, is thus now immediately changed from the initial reference voltage level and placed at a higher positive voltage $F_c$ as at $t_{(1)}$ in FIG. 2G. This bias voltage serves to "block", inhibit or maintain switch $A_2$ in the "off" condition, as variously termed, in which switch output at H is a voltage "low" inasmuch as it is greater than the voltage to which $C_3$ (or $C_1$) as later described, may be charged.

Concurrently, current flows from circuit input A through diode $D_5$ and resistor $R_{13}$ into capacitor $C_4$ for rapidly charging capacitor $C_4$ to the voltage level at circuit input A.

If at this time a transient positive voltage appears at circuit input B and is lower in voltage level than that voltage presented at circuit input A, the transient voltage is applied via resistor $R_6$ and $R_7$ to input E of switch $A_2$. Assuming the transient to persist for a sufficient interval to account for the time delay inherent in charging capacitor $C_3$ through resistor $R_6$ and $R_7$, the voltage at input E of switch $A_2$ is seen to remain less than that at its input F obtained as previously described. Hence, switch $A_2$ in that circumstance cannot switch into its "on" or second state during the duration of the high pulse at input A in which switch $A_2$ is in the "on" state. When the "high" pulse at input A terminates and is at a voltage low or zero, a discharge current path for capacitor $C_1$ is now established through resistor $R_2$, diode $D_1$, through input A into the source in circuit 3. Diode $D_1$ effectively shunts current around resistor $R_1$ in this direction to allow the capacitor to discharge in a much shorter interval than was taken to charge up that capacitor, and is of a significantly shorter discharge time contant than the parallel discharge established for capacitor $C_1$ through the resistor $R_3$. Concurrently with the termination of the voltage "high" at circuit input A, as at $t_{(3)}$ in FIG. 2A, a discharge path is established for capacitor $C_4$ through resistors $R_{14}$ and $R_{10}$ to input A which at this time is at a voltage low or zero. It is recalled that capacitor $C_4$ charged up to the level of the input voltage at A, $+V_c$, and the voltage across $C_4$ is now applied through diode $D_6$, which is properly poled, to input F of operational amplifier $A_2$. The voltage across $C_4$ thus "inhibits" or maintains operational amplifier $A_2$ in its "off" state and $A_2$ retains a voltage "low" at its output H, irrespective of the presence of a "high" at circuit input B for an interval, $t_6$, as in FIG. 2G at b, or time $t_{(4)}$. It is noted also that a parallel discharge path for $C_4$ exists through the high resistance input of $A_2$ but this additional path is not for that purpose and is not significant, as is understood by those skilled in the art.

The time constant of this discharge path by design is slightly greater than the discharge time constants of the timing circuits including either capacitor $C_3$ or $C_1$ so that the voltage at input F of $A_2$ is always higher than the voltage at input E of $A_1$ if inputs A and B go simultaneously to the voltage low condition. This prevents the output H from switching positive I and providing an unwanted drive pulse to input K of I if inputs A and B are driven low simultaneously. By way of example, SVT 6062 type of transistors used in a practical embodiment hereinafter described, have charge storage times on the order of 2 to 3 microseconds. A graphical comparison of the relative voltages and discharge rates is depicted in FIG. 2I, in which curve 1 represents the voltage at the reference input and curve 2 represents the voltage at the control input of operational amplifier switch $A_1$ overlapping in time for this comparison.

As soon as the voltage "high" pulse is presented at circuit input B at time $t_{(5)}$ in FIG. 2B, operation previously described in connection with switch $A_1$ occurs with respect to switch $A_2$. Immediately with a "high" at each end of the resistor voltage divider, resistors $R_4$ and $R_5$, the voltage applied from the voltage divider to input D of switch $A_1$ becomes "high" as at $t_{(5)}$ in FIG. 2D, and is by design greater than the voltage present at input C at this time. Switch $A_1$ is thus held in or switched to the "off" condition with its output G at a voltage low. The associated transistor in the inverter is thus turned off.

Concurrently, capacitor $C_2$ commences to charge from circuit input B, diode $D_3$ and resistor $R_{11}$ to prepare the circuit for operation at the termination of that "high" at circuit input B. And lastly, current flows from circuit input B, resistors $R_6$ and $R_7$, into capacitor $C_3$ to commence charging of the capacitor. Recognizing that the voltage divider provides one input voltage to input F of $A_2$ and considering that the voltage (FIG. 2G) applied via diode $D_6$ to have reduced in level after the lapse of an interval of time, $t_6$, the voltage applied to input E established across capacitor $C_3$ as it charges up as at $t_{(6)}$ in FIG. 2F (at c), becoms greater than the voltage at input F, the reference input, and switch $A_2$ switches into its "on" condition changing its output at H from a "low" to a voltage "high" and, concurrently, applying a driving voltage and current via circuit output K, as at $t_{(6)}$ in FIG. 2H, to the associated second transistor in inverter circuit 1. Inasmuch as the timing circuit consisting of capacitor $C_4$ and resistor $R_{14}$ as well as that timing circuit formed of $R_6$, $R_7$ and capacitor $C_3$ ensures that switch $A_1$ and, hence, the first inverter transistor has completely turned off after the expiration of its charge storage time before the second inverter transistor is turned on, there is no overlap in operation of the inverter transistors.

It is apparent that switch $A_1$ remains in the "off" condition even though a voltage transient of a level less than the level of "high" at input B appears in the same manner as previously described for such kind of transient appearing at input B during the presence of the proper "high" pulse at input A, inasmuch as the input at E now will remain at a higher voltage level than that voltage applied at input F of switch $A_2$.

When the high pulse at circuit input B terminates $t_{(7)}$ in FIG. 2B and circuit input B goes to zero or low and the voltage "high" is reapplied at circuit input A, switch $A_1$, associated with circuit input A, remains "off" for an interval of time, $t_6$, during which capacitor $C_3$ is discharging through resistor $R_7$, diode $D_2$ and circuit input B as at FIG. 2F location d.

Additionally, with a low at circuit input B, capacitor $C_2$, which as previously described charged to essentially the level of the high previously existing at input B, applies the voltage thereacross through diode $D_4$ to the input D of switch $A_1$ and simultaneously commences to discharge through resistor $R_{12}$ and into the low at circuit input B, as in FIG. 2D at time $t_{(7)}$. It is noted that another discharge path includes that through diode $D_4$ and resistor $R_5$ to circuit input B as well as through the high impedance input D of operational amplifier $A_1$, but this is not a significant discharge path and the operation of these circuit elements serve the same function and purpose as that previously described for capacitor $C_4$ and associated resistor $R_{14}$ associated with operational amplifier $A_2$. Capacitor $C_2$ thus serves at this time to maintain a clocking potential on input D of switch $A_1$ over an interval of time as at curve portion e in FIG. 2D until the input voltage applied to switch input C (FIG. 2C) exceeds the level to which the voltage at input D has fallen.

The reapplication of the voltage high to circuit input A at $t_{(i)}$, FIG. 2A, results in the gradual charging of capacitor $C_1$ and the application after a predetermined interval of time, $t_1$, defined in part by the time constant of the timing network formed of resistors $R_1$, $R_2$ and $C_1$ at switch input C in the manner initially described in the description of operation of the protective circuit, and the sequence repeats. Switch $A_1$ changes its output at G from a voltage low to a voltage high and supplies the associated inverter transistor via circuit output C with the appropriate drive signal necessary to switch the inverter transistor into the conductive state as at $t_{(10)}$ in FIG. 2E.

The operation of the protective circuit of FIG. 1 under "fault" conditions is further explained in connection with exemplary input and output voltage waveforms graphically depicted in FIG. 2 which, although not necessary to the description of the invention previously given and essentially self-evident, will ensure an understanding of its design, functional relationship of the elements and the beneficial results obtained even by those of lesser skill in this art. Thus, if because of a "fault" condition the digital drive circuits of element 1 provide "high" pulses at circuit inputs A and B, simultaneously, as represented in FIG. 3A, each of circuit outputs J and K remains at a voltage low and both inverter transistors remain "off". This occurs because the voltage high at circuit input A is immediately applied via resistor $R_{10}$ to reference input F of switch $A_2$ and the voltage high at input B is immediately applied via resistor $R_5$ to reference input D of switch $A_1$ to bias each of those switches in the off or "low" output condition, as may be variously termed. This results because the "high" applied to and attained at input E via input B is slightly less in level than that voltage "high" at reference input F due to the slight voltage dividing action of resistors $R_6$ and $R_7$ and resistor $R_8$. The same is true with respect to switch $A_1$ in that the voltage dividing action of resistors $R_1$ and $R_2$ and $R_3$ prevent the voltage high at input C from rising above the level at reference input D in this situation. By way of specific example, assuming capacitor $C_1$ to have become fully charged, the voltage drop across $R_3$ applied to input C is approximately $0.8 V_c$, where $V_c$ is the high applied at A, while the voltage applied at reference input D via resistor $R_5$ is approximately $V_c$, where $V_c$ is the "high" at circuit input B.

If the high input pulses simultaneously applied at circuit input A and B also terminate simultaneously, the output of the protective circuit at each of J and K remains at a voltage low, as graphically depicted by the waveform of FIG. 3B. The reason for this is that the voltage applied to the reference input (second input) of each of switches $A_1$ and $A_2$ is higher initially and falls off at a slower rate than the voltages applied to the control input (first input) of each of those switches upon simultaneous termination of the voltage "high" at each of circuit inputs A and B. Reference again may be made to the waveforms of FIG. 2. The voltage, a "high", which holds off or inhibits switch $A_1$ when circuit input B is at high, is presented in FIG. 2D. Upon termination of the input pulse at input B, that voltage gradually decreases under control of a discharge R-C timing network, capacitor $C_2$ and resistor $R_{12}$ in FIG. 1, represented by the point E of FIG. 2D. The relative rates of discharge may be compared in FIG. 2I. The corresponding inhibit voltage for switch $A_2$ appearing at input F is of the character appearing in FIG. 2G at curve portion b controlled by a corresponding discharge R-C type timing network.

If an input had been presented at circuit inputs A and B, as is being considered under this fault condition, and persists beyond the previously described delay interval, the operating inputs C and E of switches $A_1$ and $A_2$, respectively, are at the maximum level of the voltages depicted correspondingly in FIGS. 2C and 2F. As is apparent from the referenced figures, when the voltages at circuit inputs A and B are terminated there is a slight time delay during which the voltage at the first input of each of the switches decreases from the high level, as represented at f in FIG. 2C for input C of switch $A_1$ and at d in FIG. 2F for input E of switch $A_2$. The voltage applied to the blocking input is larger and the time constant of the blocking circuit for each switch is slightly longer, preferably, than the corresponding voltage and discharge rate of the input circuit of the switch as is illustrated in FIG. 2I, in order that the blocking inputs should continue to block and provide a reference potential at the reference inputs of the respective switches that remains higher with passage of time than the gradually declining voltages at the associated operating inputs. Thus any false triggering or switching of either switch $A_1$ or $A_2$ into the "on" condition is prevented during this fault condition.

In the next fault condition, a voltage high is applied by digital circuits 3 to circuit input A a short interval of time, $t_7$, prior to the appearance, subsequently, of a voltage high pulse at circuit input B, as is graphically depicted in FIG. 3C. The time $t_7$ in this assumption is equal to or less than the charge storage time of the associated inverter transistors in circuit 1 and accordingly less than the time delay inhering in the R-C timing network consisting of resistors $R_1$, $R_2$ and capacitor $C_1$. In this fault condition the circuit outputs at C and D remain at a voltage low and the associated inverter transistors remain "off." The reason therefor is apparent from the preceding description of operation of FIG. 1. The appearance of a high at circuit input A is immediately applied via resistor $R_{10}$ to input F of switch $A_2$ to inhibit switch $A_2$. When the voltage high is thereafter applied at circuit input B associated with switch $A_2$, that "high" is applied almost immediately to input D of switch $A_1$ to hold $A_1$ "off." However, the voltage high applied at circuit input A is not effectively applied to input C of switch $A_1$ until the lapse of a predetermined interval of time, when the voltage built up upon charging capacitor $C_1$ has attained a sufficient value to exceed that at reference input D. The appearance of the high pulse at circuit input B within that interval, $t_7$, thus prevents switch $A_1$ from switching "on" to a high output.

However, if the high at circuit input A persists for a greater interval of time, $t_8$, prior to the appearance of a voltage high at B in another example of a fault condition, as is graphically depicted in FIG. 3D, switch $A_1$ switches into its "on" or high output level condition momentarily. Thus, considering the circuit of FIG. 1 with the high input applied at circuit input A for the interval of $t_8$, reference input D of switch $A_1$ remains at the bias reference level of 0.5V established from voltage divider $R_4$ and $R_5$ between source $+V$ and the ground or low at input B, and as soon as the voltage across capacitor $C_1$ builds up to this value so that the voltage at C is equal to or greater than that at D, switch $A_1$ immediately switches its output condition to a voltage high, as indicated in the figure. And switch $A_1$ remains in this condition until the appearance of the overlapping high pulse at circuit input B, which high is then applied via resistor $R_5$ to input D resulting in input D of switch $A_1$ being placed at a higher voltage than its input C and causing switch $A_1$ to restore to a normal low output condition at output J. The circuit output at K remains low throughout as depicted.

A further fault condition of overlapping high pulses is depicted graphically in FIG. 3E, a condition in which the voltage high pulse at circuit input A terminates an interval of time, $t_6$, prior to the termination of an overlapping voltage high at input B. The result is that the output at circuit output J remains "low" whereas the circuit output K normally goes "high" for a portion of the interval by which the high input voltage at circuit B persists beyond that applied at circuit input A. The inverter transistor associated with output K is thus driven to its "on" condition momentarily, but that does not harm the inverter.

In viewing FIG. 1, one visualizes the termination of voltage high at circuit input A and a persistent voltage high at circuit input B. The high at B is applied via resistor $R_5$ to maintain input D of switch $A_1$ at a voltage high, resulting in switch $A_1$ remaining in the off condition, as graphically denoted. The removal of the high at input A, however, places a voltage low or ground at one end of resistor $R_{10}$. Capacitor $C_4$, however, was charged to approximately the voltage high. Thus a voltage high is applied via capacitor $C_4$, diode $D_6$ to input F.

Capacitor $C_4$ commences to discharge through resistor $R_{14}$ through the voltage low at circuit input A. After a period of time, capacitor $C_4$ discharges sufficiently so that switch input F is less than the "high" applied to input E from circuit input B, a level of approximately 0.8V, and switch $A_2$ switches "on" or to the high output condition providing a high output at circuit output K. Of course, when the "high" pulse at B terminates, the voltage at input E remains high momentarily due to the charge received in capacitor $C_3$. However, capacitor $C_3$ rapidly discharges through resistor $R_7$ and diode $D_2$ which is properly poled to pass this discharge current flow to the "low" existing then at circuit input B, and after a very short interval, the voltage at input E drops to below that at input F provided by the voltage divider network, $R_9$ and $R_{10}$, and switch $A_2$ switches to the off or voltage low output condition. That sequence defines the short pulse output at output K depicted in FIG. 3E.

Lastly, an overlapping input pulse fault condition is depicted in which a "high" pulse at circuit input B occurs simultaneously with the appearance of a high pulse at circuit input A, as depicted in FIG. 3F. What occurs in the circuit of FIG. 1 initially is essentially the same as that previously described in connection with the fault condition depicted in FIG. 3A. When the pulse at input A terminates, what then occurs is essentially the same circuit action as described in connection with the fault condition of FIG. 3E, the preceding example. Hence, after the lapse of a short interval after the termination of the pulse at A defined by the discharge time of capacitor $C_4$ associated with input F of switch $A_2$, switch $A_2$ becomes properly biased at input E and switches to the on or high output condition providing a voltage high at output K.

In the various conditions considered, the circuit outputs at J and K either remained at low or one or the other of the outputs went to a voltage high for a momentary interval which was a fraction of the normal pulse duration needed to drive the inverter transistors or, in the case depicted in the FIG. 3F, results in a slightly shorter drive pulse to one of the inverter transistors. Such an output, although defeating in part the normal operation of the inverter, entirely avoids the condition in which both inverter transistors are simultaneously placed in the current conducting condition, a situation which could cause inverter transistor damage.

By way of specific example of a practical embodiment of this circuit, operational amplifiers $A_1$ and $A_2$ may be of the type LM-134, obtained from the National Semiconductor Company of Sunnyvale, Calif. Diodes $D_1$, $D_2$, $D_3$, $D_4$, $D_5$ and $D_6$ may be conventional type IN 4148.

| Resistors | $R_1$, $R_6$ | 1,000 ohms |
|---|---|---|
| | $R_2$, $R_7$ | 442 ohms |
| | $R_3$, $R_8$ | 2.94 kilohms |
| | $R_p$, $R_g$ | 3.16 kilohms |
| | $R_5$, $R_{10}$ | 1.62 kilohms |
| | $R_{12}$, $R_{14}$ | 7.68 kilohms |
| | $R_{11}$, $R_{13}$ | 909 ohms |
| | $C_1$, $C_3$ | .0068 microfarad (mfd.) |
| | $C_2$, $C_4$ | .0047 mfd. |

The digital control circuit with which the practical embodiment is used is intended to produce voltage pulses of a level of 15 volts and a duration of between 10 and 15 microseconds and at a pulse repetition rate of 27 kilohertz with the pulses supplied at alternate ones of its outputs spaced in time normally by approximately 18.5 microseconds. The inverter transistors $TR_1$ and $TR_2$ may be type SVT 6062, manufactured by th TRW Company of California.

If it is desired to have the circuit made immune from high voltage transients as an additional function to the circuit protection disclosed, those skilled in the art recognize that suitable high voltage limiting devices may be added to the protective circuit, such as at input terminals A and B. For example, one such type of protection may take the form of Zener diodes which may have a reverse breakdown voltage of slightly greater than the normal pulse voltage applied, $V_c$ in the preceding description, and which conduct current only in the event that the voltage applied thereacross exceeds the breakdown voltage and shunt such high voltage from the circuit elements.

The invention automatically turns off one of the output channels if an overlapping pulse appears at the input. In addition, the circuit provides time delays to allow for the storage time of the inverter switching transistors. The charge storage which is found in essentially all bi-polar transistors of the variety used in high power inverters allows a transistor to continue passing collector current for a very short interval after the transistor's base drive signal is removed. In inverter circuits of the type considered here and improved upon by the protective circuit of the invention, turning on one transistor within the storage time of the other transistor, allowing both to be in the electrically conducting state conducting current, could cause transistor damage. The invention thus ensures that neither of the two inverter transistors can be turned on during the storage time of the other. As those skilled in the art now recognize, the time delays may be individually controlled, such as by varying the value of resistors or substituting variable resistors for the fixed variety illustrated, to make suitable adjustment permits the time delays to be tailored to the storage time characteristics of any specific inverter switching transistor used. As is further recognized by those skilled in the art, the invention makes use of linear semiconductor switching elements, although the circuit in fact performs a digital function in part, i.e. that of a "not" gate. With linear components one may control circuit speed, threshold levels, and noise immunity, allowing an inverter system to be precisely tailored so as to make the inverter relatively insensitive to those current and voltage transients which would normally cause digital type semiconductor circuitry to produce false outputs.

Those skilled in the art also recognize that the operation has been described in terms of voltage "highs" and "lows" but that by simply reversing the polarity of the elements or substituting elements of opposite polarity to that used, equivalent to a reversal of parts, the circuit element perform together in essentially the same manner to obtain the same result and that the language of the claims is intended to cover such equivalents. Thus, if a semiconductor switch is used in an alternative embodiment which has a normal high output and is switched to low, then either the inverter transistors would be reversed in polarity from that described in FIG. 1, requiring a voltage low as the driving signal, or a conventional pulse inverter element would be added to the circuit coupled in between the outputs of the operational amplifier and the transistor, all of which structure incorporate the present invention.

It is believed that the embodiment of the invention presented in FIG. 1, as well as the specific details of a practical embodiment hereinbefore illustrated and described, is sufficient to enable those skilled in the art to understand and make and use the invention without undue experimentation. However, it is expressly understood that the invention is not limited to those details presented for the foregoing purpose, inasmuch as other circuit configurations using linear type semiconductor elements could be arranged to produce the input and output waveforms presented in FIGS. 2 and 3, or their equivalent, all of which are within the scope of the invention, as well as improvements thereto which become apparent to one skilled in the art upon reading this specification. In its essence, the invention incorporates the cross-gating of one channel with a second channel, using linear semiconductor switch means to ensure that only one output appears at any interval of time and prevents both outputs from being provided simultaneously or even within a certain interval of time between one another at least as great as the charge storage time of the inverter transistors. Accordingly, it is respectfully requested that my invention presented herein be broadly construed within the full spirit and scope of the appended claims.

What I claim is:

1. In a high-power inverter-rectifier combination of the type which includes at least a pair of transistors connected in circuit with a transformer for generating an alternating voltage in a secondary winding of said transformer by alternately operating said transistors to alternately conduct current, each of said transistors having a predetermined charge storage time, $T_c$, and a digital semiconductor type driving circuit means for alternately applying voltage pulses of a given duration and at a periodic repetition rate at each of two driving circuit means outputs for controlling the alternating operation of said transistors, the improvement thereto which comprises, in combination therewith, a protective circuit containing:

(a) first and second circuit inputs;

(b) corresponding first and second circuit outputs;

(c) each of said inputs being connected to an associated corresponding one of said two driving circuit outputs and each of said circuit outputs being connected to an associated corresponding one of said two transistors to place said protective circuit means intermediate said inverter transistors and said driving circuit means;

(d) cross-gating means, including linear semiconductor switch means, connected in between said circuit inputs and circuit outputs for producing a driving output pulse on a one of said circuit outputs responsive to the presence of a voltage pulse at an associated one of said circuit inputs only during the absence of a voltage pulse at the other one of said circuit inputs; and (e) delay means coupled to said cross-gating means for inhibiting the application of said driving output pulse at a one of said circuit outputs until the lapse of a predetermined interval of time, $\Delta T$, subsequent to the termination of a driving output pulse at the other one of said circuit outputs, said predetermined interval of time, $\Delta T$, being at least as great as the defined charge storage time, $T_c$, of said inverter transistors and less than half the duration of pulses supplied by said digital control circuit to said first and second circuit inputs.

2. In an inverter-rectifier combination of the type which includes a pair of transistors connected in circuit with a transformer for generating an alternating voltage in a secondary winding of said transformer responsive to alternate operation of said transistors, each of said transistors having a predetermined charge storage time, $T_c$, and which includes digital semiconductor type driving circuit means for providing driving voltage pulses alternately at each of two outputs, each of said outputs associated with a respective one of said transistors, the improvement therein which comprises in combination:

protective circuit means, including a first and second input associated, respectively, with corresponding ones of said outputs of said digital driving circuit means, and including first and second outputs connected in circuit, respectively, with corresponding ones of said first and second transistors;

first linear semiconductor switch means having a first and second input and an ouput;

second linear semiconductor switch means having a first and second input and an output;

each of said linear semiconductor switch means being of the type which has a first electronic state in which a first voltage level is presented at an output responsive to the voltage level applied at said first input being greater than the voltage level applied at said second input and which has a second electronic state in which a second voltage level is presented at said output responsive to the voltage applied at said second input being equal to or greater than the voltage applied at said first input;

means connecting said outputs of said first and second linear semiconductor switch means, respectively, to corresponding ones of said first and second outputs of said circuit;

first means, including first time delay means, connected in circuit between said first circuit input and said first input of said first switch means, responsive to the presence of a voltage high at said first circuit input for providing a voltage of predetermined level but less than a voltage $V_{max}$ at said first input of said first switch means after the lapse of a predetermined time interval subsequent to the application of said voltage high;

second means connected in circuit between said first circuit input and said second input of said second switch means responsive to the presence of a voltage high at said first circuit input for providing initially a voltage in excess of said predetermined voltage level and in excess of $V_{max}$ at said second input of said second switch means to place said second switch means in the second electronic state;

third means, including third time delay means, connected in circuit between said second circuit input and said first input of said second switch means responsive to the presence of a voltage high at said second circuit input for providing a voltage of a predetermined level but less than a level $V_{max}$ at said first input of said second switch means after the lapse of a predetermined time interval subsequent to the application of said voltage high;

fourth means connected in circuit between said second circuit input and said second input of said first switch means responsive to the presence of a voltage high at said second circuit input for providing a voltage in excess of said predetermined voltage level and in excess of $V_{max}$ at said second input of said first switch means;

whereby one of said first and second switch means is switched to or remains at a first electronic state with the output of such one of said semiconductor switch means being switched to or remaining at a first voltage level only if a voltage high is present for a predetermined time interval at the corresponding one of said first and second circuit inputs and only in the absence of a voltage high at the other circuit input.

3. The invention as defined in claim 2 wherein said second means includes: second time delay means for retaining said second input of said second switch means at a voltage in excess of said predetermined level for a predetermined interval subsequent to the termination of said voltage high at said first circuit input to thereby ensure that said second linear semiconductor switch means remains in its second electronic state until the expiration of a predetermined time thereafter, greater than the transistor charge storage time of the second transistor in said inverter circuit; and wherein said fourth means further includes: fourth time delay means for retaining said second input of said first switch means at a voltage in excess of said predetermined level for a predetermined interval subsequent to the termination of a voltage high at said second circuit input to thereby ensure that said first linear semiconductor switch means remains in its second electronic state until the lapse of a predetermined time thereafter greater than the charge storage time of said first transistor in said inverter associated with said first switch means.

4. The invention as defined in claim 2 wherein said first predetermined time interval is approximately equal to or slightly greater than the charge storage time of said inverter transistor associated with said first transistor; and wherein said second time interval is equal to or slightly larger than the charge storage time of said second transistor.

5. The invention as defined in claim 2 wherein each of said first and third time delay means provide delay intervals within the range of three microseconds to seven microseconds.

6. The invention as defined in claim 2 wherein each of said second and fourth time delay means provide delays within the range of two microseconds to four microseconds.

7. The invention as defined in claim 2 wherein each of said first and third time delay means comprises resistor means and capacitor means connected in series circuit and means for permitting said capacitor means to discharge at a rate faster than said capacitor means may charge.

8. The invention as defined in claim 2 wherein each of said first and third time delay means comprise: first and second resistor means and capacitor means connected in series between said associated circuit input and circuit ground; diode means connected in shunt of one of said resistor means and electrically poled for shunting current in bypass of said resistor means when said circuit input is of a voltage level that is less than the voltage across said capacitor means, whereby said time delay circuit has a charging characteristic and a discharging characteristic, and latter being faster than the former.

9. The invention as defined in claim 8 further comprising third resistor means connected in shunt of said capacitor means, said third resistor means comprising a very high resistance level, substantially larger than either of said first and second resistor means, to limit the maximum voltage to which said capacitor means may charge to a level less than applied to said circuit input.

10. The invention as defined in claim 3 wherein each of said second and fourth time delay means comprises an R-C type timing network having a charging characteristic and a discharging characteristic, the former being faster relatively than the latter.

11. The invention as defined in claim 3 wherein each of said second and fourth time delay means comprises:
resistor means and capacitor means connected in series between associated circuit input terminal and circuit ground; said capacitor means adapted to charge to a voltage from said input terminal;
diode means connected between said capacitor means and a second input of an associated switching means;
said diode means being electrically poled so as to conduct current to said second input only when the voltage level on said capacitor is greater than a bias voltage level at said second input of the associated switching means;
and wherein each of said second and fourth means; includes biasing network means including a voltage source;
first resistor means connected between said source and said second switching means input; second resistor means connected between said second input and the associated circuit input terminal to establish a bias voltage level at said second switching means input;
whereby when said circuit input terminal is at a voltage low said second input of said asociated switching means is maintained at said intermediate predetermined voltage or at a higher voltage as a function of the degree of discharge of said capacitor means, and when said circuit input is at a voltage high said second input of said switching means is placed at a voltage high.

12. The invention as defined in claim 11 wherein each said timing network means further includes diode means and resistor means connected in series between said associated circuit input terminal and said capacitor means for shunting current about said first resistor means responsive to said associated circuit input terminal being at a voltage high for rapidly charging said capacitor means, whereby upon removal of a voltage high at said associated circuit input said second input of said associated switching means receives a voltage from said capacitor means and maintains a voltage higher than said bias level until said capacitor discharges substantially essentially through said first resistor means.

13. A protective circuit for an electrical inverter of the type which contains first and second transistors coupled in circuit with a transformer winding and a digital type semiconductor circuit having first and second outputs designed to provide a voltage high at each of said first and second outputs alternately at a high frequency rate for controlling alternate operation of said first and second transistors, whereby high frequency AC may be generated in said transformer, comprising in combination:
first linear semiconductor switch means having first and second inputs and an output;
second linear semiconductor switch means having first and second inputs and an output;
each of said semiconductor switch means being of the type which provides a first output condition responsive to the voltage level supplied to said second input being equal to or greater than the voltage input supplied to said first input and for providing a second output state when the voltage at said first input is greater than that at said second input;
a first circuit input;
first and second resistor means connected in series circuit between said first circuit input and said first input of said first switch means;
a second circuit input;
third and fourth resistor means connected in series circuit between said second circuit input and said first input of said second switch means;
first diode means connected in shunt of said first resistor means and poled to conduct current toward said first circuit input;
second diode means connected in shunt of said third resistor means and poled to conduct current toward said second circuit input;
first capacitor means connected between said first switch input of said first switch means and a circuit ground;
second capacitor switch means connected between said first switch input of said second switch means and said circuit ground;
a voltage source of voltage high;
fifth and sixth resistor means connected in series circuit between said voltage source and said first circuit input;

seventh and eighth resistor means connected in circuit between said source and said second circuit input;

means connecting the circuit juncture of said fifth and sixth resistor means in circuit with said second switch input of said second switch means;

means connecting the circuit juncture of said seventh and eighth resistor means in circuit with said second switch input of said first switch means;

third diode means, ninth resistor means, and fourth diode connected in series circuit between said second circuit input and said second input of said first switch means, said diodes being poled in the same direction for conducting current in a direction from said second circuit input;

tenth resistor means connected in shunt of said third diode and said ninth resistor;

third capacitor means connected between a juncture between said fourth diode and ninth resistor and a circuit common;

fifth diode means, an eleventh resistor and sixth diode means connected in circuit between said first circuit input and said second switch input of said second switch means, said diodes being poled in the same direction for conducting current in a direction from said first circuit input;

a twelfth resistor means connected in shunt of said fifth diode and said eleventh resistor means, and fourth capacitor means connected between a juncture between said sixth diode and eleventh resistor means and circuit common.

* * * * *